(12) United States Patent
Jo et al.

(10) Patent No.: US 12,184,595 B2
(45) Date of Patent: Dec. 31, 2024

(54) METHOD AND DEVICE FOR PROVIDING CHAT SERVICE IN MAP-BASED VIRTUAL SPACE

(71) Applicant: KAKAO CORP., Jeju-si (KR)

(72) Inventors: Hyuk Jo, Seongnam-si (KR); Yoon Sue Park, Seongnam-si (KR); Min Sol Son, Seongnam-si (KR); Ha Gyeong Lee, Seongnam-si (KR); Da Eun Yun, Seongnam-si (KR); Jung Eun Kim, Seongnam-si (KR); Jin Young Yang, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 11 days.

(21) Appl. No.: 18/088,729

(22) Filed: Dec. 26, 2022

(65) Prior Publication Data
US 2023/0208789 A1    Jun. 29, 2023

(30) Foreign Application Priority Data
Dec. 27, 2021  (KR) ........................ 10-2021-0188857

(51) Int. Cl.
*H04L 51/046* (2022.01)
*H04L 51/222* (2022.01)

(52) U.S. Cl.
CPC .......... *H04L 51/046* (2013.01); *H04L 51/222* (2022.05)

(58) Field of Classification Search
CPC ....... G06T 17/05; G06T 19/003; A63F 13/87; A63F 13/12; G06Q 50/01
See application file for complete search history.

(56) References Cited

U.S. PATENT DOCUMENTS

| | | | | |
|---|---|---|---|---|
| 2011/0107239 A1* | 5/2011 | Adoni | ..................... | A63F 13/60 726/8 |
| 2021/0352244 A1* | 11/2021 | Benedetto | ................ | H04N 7/15 |
| 2023/0101036 A1* | 3/2023 | Yoo | ..................... | G06F 3/04842 345/633 |

FOREIGN PATENT DOCUMENTS

| | | | |
|---|---|---|---|
| KR | 20150009505 A | | 1/2015 |
| KR | 20150029088 A | | 3/2015 |
| KR | 20180089076 A | | 8/2018 |
| KR | 20200120423 A | | 10/2020 |

OTHER PUBLICATIONS

Korean Office Action for KR Application No. 10-2021-0188857 mailed on Jun. 1, 2023.

* cited by examiner

*Primary Examiner* — Caroline H Jahnige
(74) *Attorney, Agent, or Firm* — Seed IP Law Group LLP

(57) ABSTRACT

A method of providing a chat service in a map-based virtual space includes receiving a place selection signal based on map information and/or a motion detection signal from user terminals, determining location information and FoV information of the corresponding account in the virtual space, determining image information of a perspective view and one or more other accounts to be displayed on the corresponding user terminal, receiving a chat request from a first user terminal, receiving a result regarding whether to accept a chat in response to the chat request from a second user terminal, determining whether an account of the first user terminal and the other account of the second user terminal on the street view satisfy a preset condition, and providing the chat service between the first user terminal and the second user terminal based on whether the chat is accepted and whether the preset condition is satisfied.

22 Claims, 16 Drawing Sheets

METHOD AND DEVICE FOR PROVIDING CHAT SERVICE IN MAP-BASED VIRTUAL SPACE

CROSS-REFERENCE TO RELATED APPLICATION

This application claims the benefit of Korean Patent Application No. 10-2021-0188857 filed on Dec. 27, 2021, in the Korean Intellectual Property Office, the entire disclosure of which is incorporated herein by reference for all purposes.

BACKGROUND

1. Field of the Invention

One or more embodiments relate to a method and device for providing a chat service in a map-based virtual space.

2. Description of the Related Art

With the development of wired and wireless communication and the popularization of smartphones, the number of users using chat service platforms through an electronic device is increasing. The chat service platform may refer to a platform through which a user may communicate with other users via an online communication network. As various chat service platforms appear, the chat service platforms provide various types of chat services. Particularly, with the development of virtual space technology, research on technology for providing the chat services in a virtual space and interest therein are increasing. Also, when the chat service is provided in a map-based virtual space, it is advantageous that the user may experience as if the user is chatting with other people in a real place. Therefore, many companies and researchers are investing a lot of money and time in developing a platform that provides a chat service in a map-based virtual space.

SUMMARY

According to an aspect, there is provided a method of providing a chat service in a map-based virtual space. The method includes receiving at least one of a place selection signal based on map information or a motion detection signal from each of a plurality of user terminals, determining location information and field of view information of the corresponding account in the virtual space based on at least one of the corresponding place selection signal or the corresponding motion detection signal in response to each of accounts of the plurality of user terminals, determining image information of a perspective view to be displayed on the corresponding user terminal based on the location information and the field of view information, determining one or more other accounts to be displayed on the corresponding user terminal based on the location information, the field of view information, and location information of other accounts other than the corresponding account, transmitting the image information and data of a street view based on the one or more other accounts to the corresponding user terminal, receiving a chat request for another account displayed on the corresponding street view from a first user terminal among the plurality of user terminals, receiving a result regarding whether to accept a chat in response to the chat request from a second user terminal of the other account, determining whether an account of the first user terminal and the other account of the second user terminal on the street view satisfy a preset condition, and providing the chat service between the first user terminal and the second user terminal based on whether the chat is accepted and whether the preset condition is satisfied.

A place selection of the place selection signal may include at least one of a first place selection based on the map information, a second place selection based on a place search, a third place selection based on a search record, or a fourth place selection based on a keyword search.

The street view may include at least one of a two-dimensional (2D) map conversion object, at least one first account determined based on location information, at least one second account determined based on interest keyword information, another account invitation object, or a profile view object.

The motion detection signal may include a signal determined based on at least one of a moving distance, a direction change, or a movement speed change of the user terminal.

The transmitting of the data of the street view to the corresponding user terminal may include transmitting data for displaying a marketing content corresponding to a place on the street view.

The determining of the location information and the field of view information may include determining the location information and the field of view information based on time information.

The time information may include information on one time point among a plurality of time points corresponding to a corresponding place.

The receiving of the chat request may include receiving an input signal for selecting another account displayed on the street view, transmitting account information corresponding to the selected account to the first user terminal, and receiving the chat request for the selected account from the first user terminal.

The account information may include at least one of identity authentication information, job authentication information, place authentication information, or interest keyword information.

The providing of the chat service may include providing the chat service through a chat window.

The chat window may include at least one of a chat progress state information display object, a chat start notification object, an image selection object, a music sharing object, an emoticon input object, a text input object, a drawing input object, or a voice input object.

The chat window may include a chat window having, as a background, an image displayed based on at least one of image information of a perspective view or shared content information.

The providing of the chat service may include providing a private chat service in which only accounts satisfying a predetermined condition are able to participate.

The predetermined condition may include at least one of a place condition or a password condition.

A profile view displayed on the first user terminal may include at least one of a profile setting object, a profile image, a state message, job authentication information, place authentication information, interest keyword information, or a content uploaded by the first user terminal.

A content view displayed on the first user terminal may include at least one of a place movement object, an interest keyword, a place captured image, an account list, a response object, or an opening determination object.

The providing of the chat service may include, when the predetermined condition is not satisfied, transmitting quest information for satisfying the predetermined condition to the first user terminal, and when a quest completion signal based on the quest information is received from the first user terminal, providing the chat service.

The quest information may include a quest for inducing the account of the first user terminal on the street view to move so that the account of the first user terminal and the other account of the second user terminal on the street view are close to each other to have a predetermined distance or less.

According to another aspect, there is provided a device for providing a chat service in a map-based virtual space including a processor. The processor may receive at least one of a place selection signal based on map information or a motion detection signal from each of a plurality of user terminals, determine location information and field of view information of the corresponding account in the virtual space based on at least one of the corresponding place selection signal or the corresponding motion detection signal in response to each of accounts of the plurality of user terminals, determine image information of a perspective view to be displayed on the corresponding user terminal based on the location information and the field of view information, determine one or more other accounts to be displayed on the corresponding user terminal based on the location information, the field of view information, and location information of other accounts other than the corresponding account, transmit the image information and data of a street view based on the one or more other accounts to the corresponding user terminal, receive a chat request for another account displayed on the corresponding street view from a first user terminal among the plurality of user terminals, receive a result regarding whether to accept a chat in response to the chat request from a second user terminal of the other account, determine whether an account of the first user terminal and the account of the second user terminal on the street view satisfy a predetermined condition, and provide the chat service between the first user terminal and the second user terminal based on whether the chat is accepted and whether the predetermined condition is satisfied.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
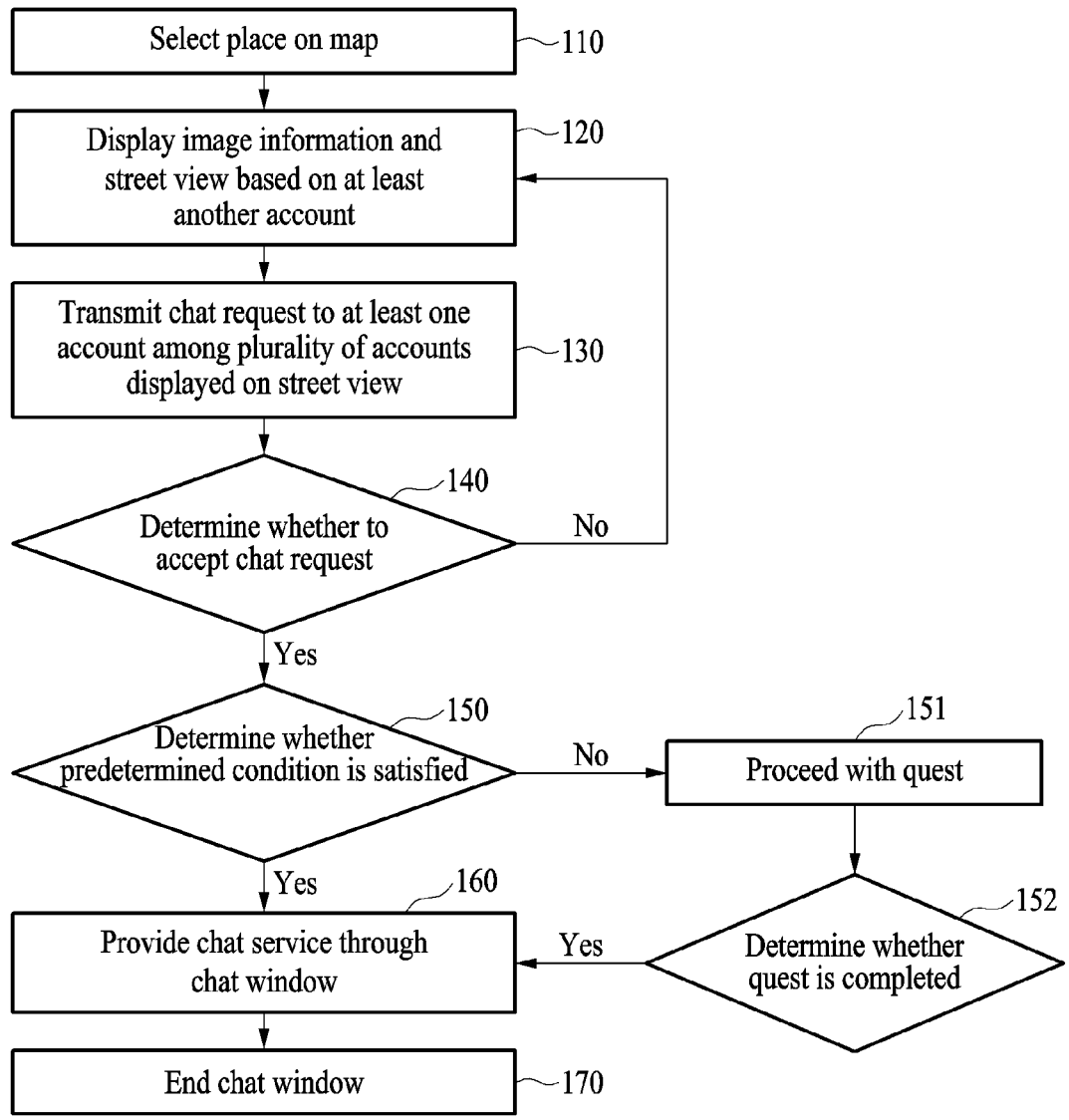
FIG. 1 is a flowchart of an operation of a method of providing a chat service in a map-based virtual space according to an embodiment.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if it is described that one component is "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, the embodiments will be described in detail with reference to the accompanying drawings. When describing the embodiments with reference to the accompanying drawings, like reference numerals refer to like elements and a repeated description related thereto will be omitted.

FIG. 1 is a flowchart of an operation of a method of providing a chat service in a map-based virtual space according to an embodiment.

A server according to an embodiment may provide a chat service in a map-based virtual space to a plurality of user terminals. A map according to an embodiment may be determined based on map information transmitted to the user terminal by the server. The map according to an embodiment may be output on a display of the user terminal based on a map application installed in the user terminal. The server may transmit, to the user terminal, data necessary for displaying a map on the display through the map application installed in the user terminal. The virtual space according to an embodiment may refer to a virtual space created by a computer, the Internet, or the like, rather than the real world. The map-based virtual space according to an embodiment may refer to a virtual space provided through the map application. Through this, the user may feel the same as existing in a real space through the user terminal. The server may transmit virtual space-related data to the user terminal so that the map-based virtual space may be displayed on the user terminal through the map application.

In operation 110, the server may receive a place selection signal on the map from the user terminal. The place selection according to an embodiment may imply that the user selects a specific place in the map application. For example, the user may select a place "Gangmun Beach in Gangneung" in the map application of the user terminal. In this case, the server may receive the selection signal for the place "Gangmun Beach in Gangneung" from the user terminal. The server may receive at least one of the place selection signal based on the map information or a motion detection signal from each of the plurality of user terminals. The motion detection signal according to an embodiment may include information generated when the user moves while carrying the user terminal. The motion detection signal may include a signal determined based on at least one of a moving distance, a direction change, or a moving speed change of the user terminal. When the user moves while carrying the user terminal, the user terminal may obtain information on the moving distance, a moving direction, and/or the moving speed by using a motion sensor or the like included in the user terminal.

The server may determine location information and field of view information of a corresponding account in the virtual space based on at least one of a corresponding place selection signal or corresponding motion detection signal in response to each of accounts corresponding to the plurality of user terminals. The server may identify a place selected by the user based on the place selection signal and determine location information of the corresponding place in the virtual space. For example, when the place selection signal includes "Gangmun Beach in Gangneung," the server may determine the location information of the place "Gangmun Beach in Gangneung" in the virtual space. Initial location information of the account in the virtual space may be arbitrarily determined by the server. The server may determine changed location information of the account based on the initial location information of the account in the virtual space and information included in the motion detection signal. For example, the initial location information of the account in the virtual space may be coordinates (0,0) in Gangmun Beach in Gangneung. The server may determine the changed location information of the account as (3,2) based on the information included in the motion detection signal.

The server may determine the field of view information based on at least one of the place selection signal or the corresponding motion detection signal. When the location of the account in the virtual space changes, the field of view may change accordingly. For example, if the account faces north in the virtual space, the field of view information may be information on a field of view in the north direction of the virtual space. If the account in the virtual space faces north and then faces west based on the motion detection signal, the server may determine the field of view information as information on the field of view in the west direction of the virtual space. Through this, the user may feel as if the user is actually moving in the virtual space.

The server according to another embodiment may determine the location information and the field of view information based on at least one of a user input signal, the place selection signal, or the corresponding motion detection signal. A touch input signal according to an embodiment may include an input signal based on a user's screen touch. A gesture input signal according to an embodiment may include an input signal based on recognizing a user's motion in the air without the user's screen touch. The user input signal may include, for example, the touch input signal (e.g., a tap of touching on a screen with a finger, a double tap of touching on a screen twice in rapid succession, a press of touching a screen for a few seconds, a swipe of moving a finger straightly, a pan of moving a finger while touching, a pinch of pinching two fingers inwards, a spread of spreading two fingers outwards, a rotate of rotating a target in a desired direction using two fingers, etc.), the gesture input signal (e.g., a gesture interacting with an electronic device with a hand motion in the air, etc.), and the like. Accordingly, the account in the virtual space may be moved based on the user's touch input and/or gesture input.

The server according to another embodiment may determine the location information and field of view information based on time information. The time information may include information on one time point among a plurality of time points corresponding to a corresponding place. For example, even though the location is "Gangnam Station," Gangnam Station in 1970 and Gangnam Station in 2010 may look different. Accordingly, the server may store perspective view image information corresponding to the plurality of time points even for one place. The server according to an embodiment may determine location information and field of view information corresponding to a corresponding time point based on time information received from the user terminal. For example, when information indicating "Gangnam Station in the 1970s" is received from the user terminal, the server may determine the location information and field of view information based on the perspective view image information of Gangnam Station in the 1970s. Through this, the server may provide the user with street views representing various time zones. Particularly, when the place in the past time is implemented as a street view and provided to the user, a virtual space where users may walk around the past place and meet people and have a chat may be provided. Through this, the users may indirectly experience the past space.

The server may determine image information of a perspective view to be displayed on a corresponding user terminal based on the location information and field of view information. The perspective view may include a three-dimensional (3D) image displaying a height, width, and depth for a realistic image. The image information of the perspective view may include information on a 3D image of an angle at which a person standing on the actual ground sees a building and/or a natural object. The image information of the perspective view may include image information generated based on a two-dimensional (2D) image taken in reality. Through this, an effect in which the user may feel the space as the same as the actual space may be expected.

The image information of the perspective view may include perspective view information of a real image. The image information of the perspective view may include, for example, perspective view information of Gangmun Beach in Gangneung, perspective view information of Haeundae in Busan, perspective view information of Central Park in New York, perspective view information of Gangnam Station, and the like. The image information of the perspective view may include not only a still image but also information on a video moving over time. Waves at Gangmun Beach in Gangneung according to an embodiment may be stationary or continuously moving. The position of the Sun at Gangmun Beach in Gangneung may change with time. Through this, the server may provide a more vivid virtual space to the user.

The server may determine at least another account to be displayed on the corresponding user terminal based on the location information, field of view information, and location information of other accounts other than the corresponding account. When the location information and field of view information of the account are changed in the virtual space, other accounts displayed on the display of the user terminal may also change accordingly. For example, the field of view information of an account 1 may be a "field of view of facing north from Gangmun Beach in Gangneung". At this time, an account 2 and an account 3 may be visible in the field of view of the account 1 in the virtual space. The server may change the location information and field of view information of the account 1 in the virtual space based on the motion detection signal. For example, the changed field of view information of the account 1 may be a "field of view facing west from Gangmun Beach in Gangneung". In this case, accounts existing in the west direction with respect to the location of the account 1 in the virtual space may be different as an account 3 and account 4. The locations of the account 3 and account 4 may be determined based on location information of the account 3 and location information of the account 4. That is, the server may determine the location in the virtual space based on the location information of each of the accounts 1 to 5, and display other accounts visible in the field of view of the account 1 with respect to the location information of the account 1 in the virtual space.

The server may transmit the image information and data of a street view based on the at least the other account to the corresponding user terminal. In operation 120, the server may display the street view on the display of the user terminal by transmitting the image information and the data of the street view based on the at least the other account to the corresponding user terminal. The street view may be a view displaying chat-related objects in the 3D image of the angle at which the person standing on the actual ground sees the building and/or the natural object. The street view will be described below in detail with reference to FIG. 4.

The server according to another embodiment may transmit data for displaying a marketing content corresponding to a place on the street view. The place may be an interior space as well as an outdoor space. For example, the place may be a department store, mart, store, or the like. The server may transmit data for displaying the marketing content on the street view to the user terminal for marketing. The marketing content may include, for example, a discount content, event content, price information, and the like. For example, when the place is a cosmetics store, the street view may display an interior space of the cosmetics store. Also, the marketing contents may be displayed in the cosmetics store, which is the virtual space. For example, the street view may display a discount content for a cosmetic 1, an event content for a cosmetic 2, and the like. Through this, the users may purchase products in the virtual space.

The server may transmit data for displaying the marketing content based on interest keyword information and/or a location of the user terminal on the street view. For example, when the interest keyword information is an "indie band lover" and the location of the user terminal is within a predetermined distance from a record store, the user terminal may reproduce the marketing content including "music to be released" on the user terminal. In another example, when the interest keyword information is a "science fiction (SF) novel lover," the marketing content may include an "electronic book (e-book) subscription event". In still another example, when the interest keyword information is a "bread lover," the marketing content may include "new bakery advertisement". In still another example, when the interest keyword information is "English conversation" and the location of the user terminal is a place, the user frequently visits, the marketing content may include "promotion of an online speaking class".

In operation 130, the server may transmit a chat request to at least one account among a plurality of accounts displayed on the street view. The server may receive a chat request for another account displayed on the corresponding street view from a first user terminal among the plurality of user terminals. In addition, the server may transmit the chat request to the corresponding account based on the received chat request.

In operation 140, the server may determine whether to accept the chat request. The server may receive a result regarding whether to accept a chat corresponding to the chat request from a second user terminal of another account. In operation 140, the server may determine whether to accept the chat request by receiving the result regarding whether to accept the chat from the second user terminal of the other account. In operation 120, when the result regarding whether to accept the chat request is determined as "rejection," the street view may be displayed on the first user terminal. When the result regarding whether to accept the chat request is determined as "acceptance," the server and/or first user terminal may determine whether to allow the user of the first user terminal to perform a quest by determining whether a predetermined condition is satisfied.

In operation 150, the server may determine whether the predetermined condition is satisfied. The server may determine whether distance information between the account of the first user terminal and the account of the second user terminal in the street view satisfies the predetermined condition. For example, the predetermined condition may be a condition in that the chat may be started only when the distance between the account of the first user terminal and the account of the second user terminal in the street view is within 2 m. Therefore, if the account of the first user terminal is not close enough to the account of the second user terminal in the street view, the chat may not be started. In operation 150, the user terminal may determine whether the predetermined condition is satisfied.

In operation 151, when the predetermined condition is not satisfied, the server may proceed with the quest. The quest may be a quest that the user of the first user terminal must perform in order to start a chat between the account of the first user terminal and the account of the second user terminal. A method of proceeding with the quest will be described below in detail with reference to FIG. 6B.

The server may provide a chat service between the first user terminal and the second user terminal based on whether to accept the chat and whether the predetermined condition is satisfied. The server may determine whether to accept the chat, and when the chat is accepted, the server may determine whether the predetermined condition is satisfied. The server may first determine whether the predetermined condition is satisfied. In addition, when the predetermined condition is satisfied, a signal regarding whether to accept the chat may be transmitted to the second user terminal and the result regarding whether to accept the chat may be received from the second user terminal. In operation 152, the server may determine whether the quest is completed. In operation 160, when the user of the first user terminal has completed the quest, the server may provide a chat service through a chat window.

In operation 170, the server may receive a chat end signal from the user terminal and end the chat window. The user terminal may end the chat by receiving an input signal for the end of the chat from the user.

Figure 2:
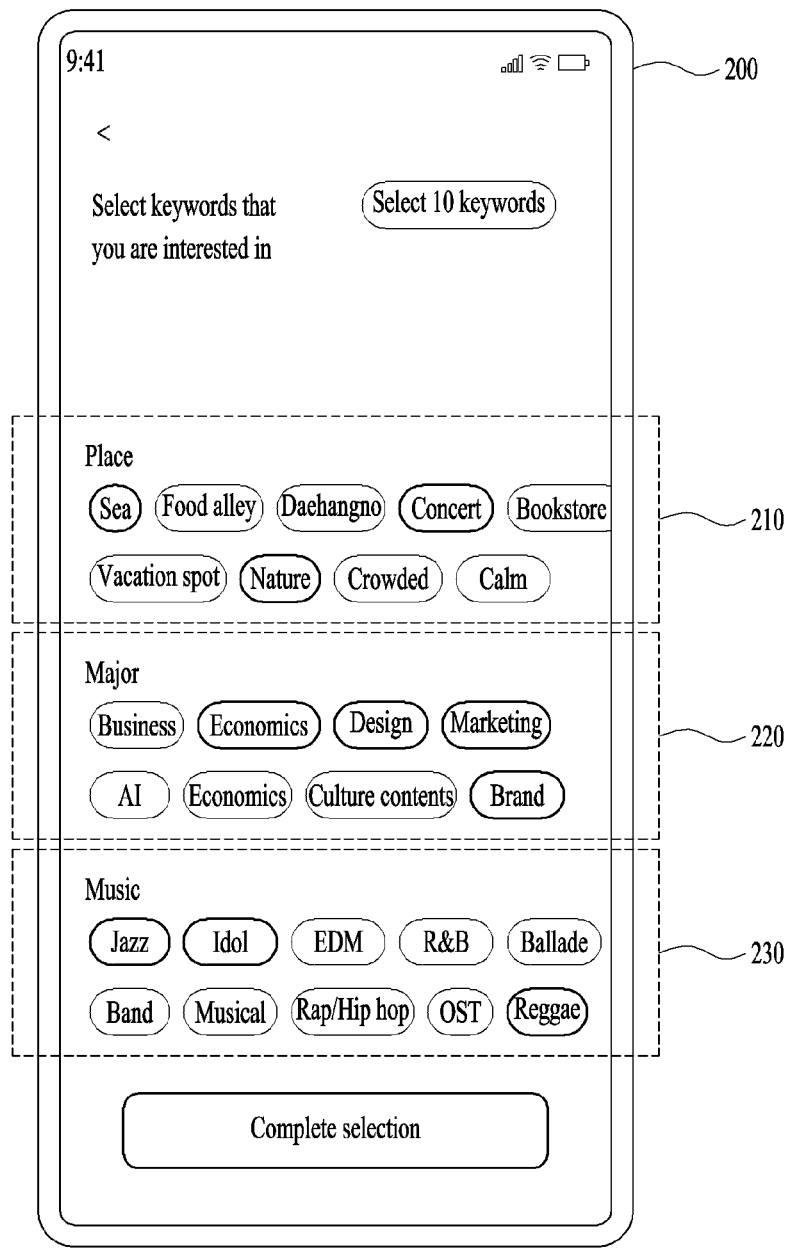
FIG. 2 is a diagram illustrating interest keyword information according to an embodiment.

FIG. 2 is a diagram illustrating interest keyword information according to an embodiment.

FIG. 2 shows an interest keyword input screen 200, place keywords 210, major keywords 220, and music keywords 230.

In the interest keyword input screen 200, the server may receive a selection input signal for the interest from the user and may generate interest keyword information. The server may recommend an account having the same interest as a specific account based on the interest keyword information. In addition, the server may transmit information on matching of the interest keyword between the accounts to user terminals corresponding to the accounts, respectively, by comparing the pieces of the interest keyword information between the plurality of accounts.

In the interest keyword input screen 200, a user selection input for a plurality of keywords may be received. For example, a minimum of 4 keywords to a maximum of 30 keywords may be selected. A keyword input through the keyword input screen 200 may be changed later by the user through a profile view.

Sea, concert, and nature may be selected as the place keywords 210, economics, design, marketing, and brand may be selected as the major keywords 220, and jazz, idol, and reggae may be selected as the music keywords 230.

Figure 3A:
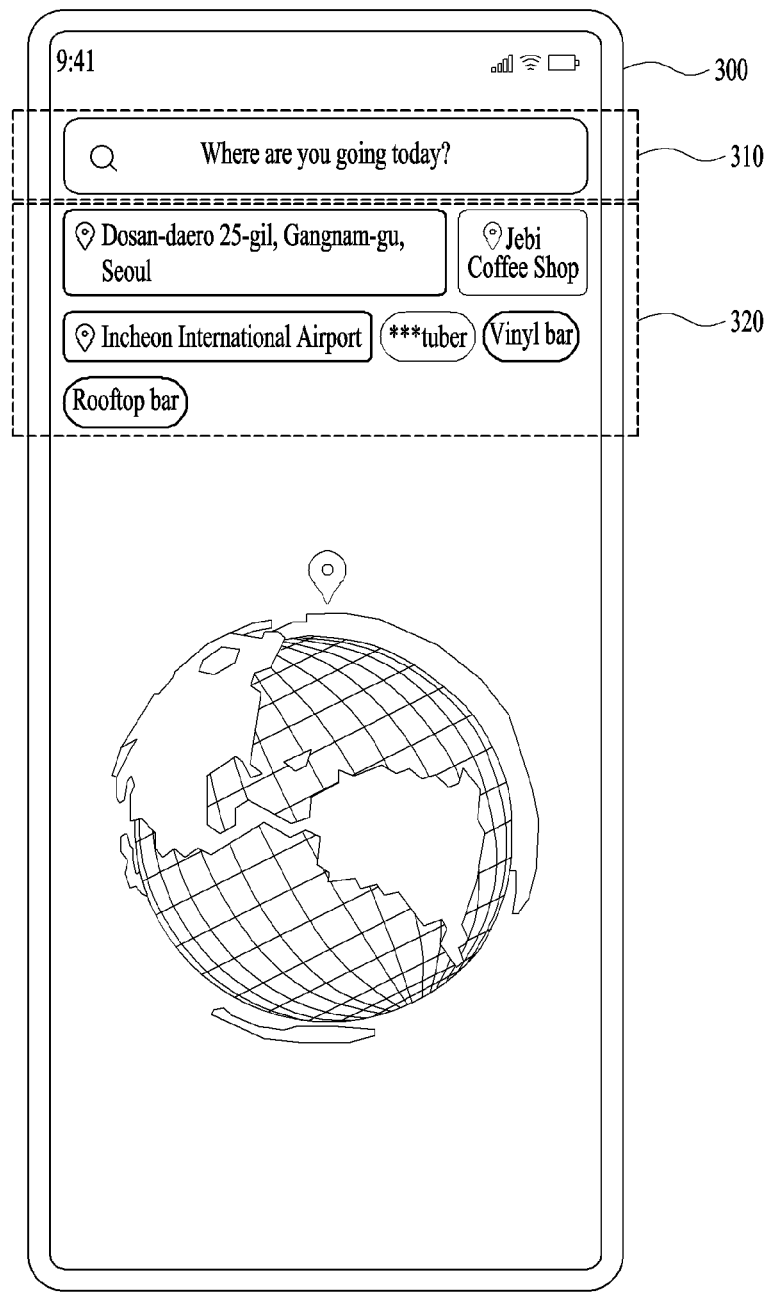
FIGS. 3A to 3C are diagrams illustrating a place selection operation according to various embodiments.
Figure 3B:
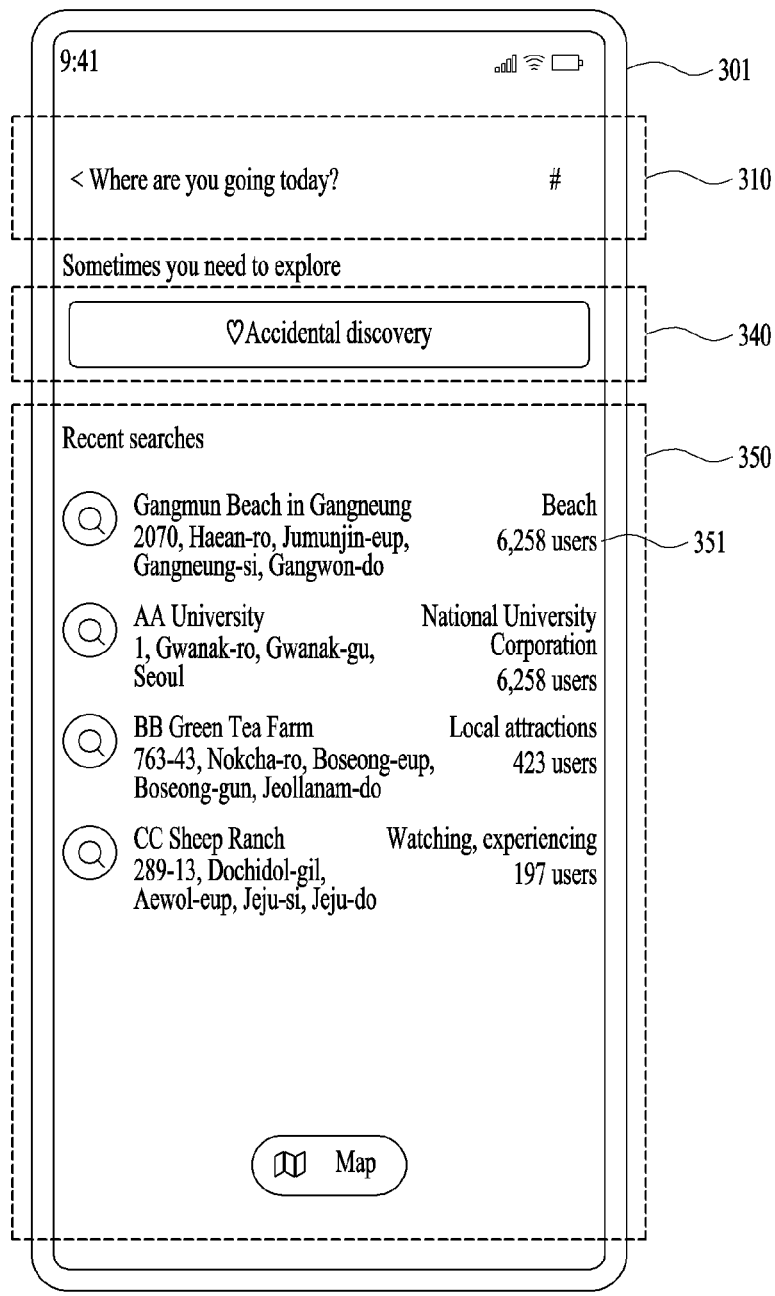
Figure 3C:
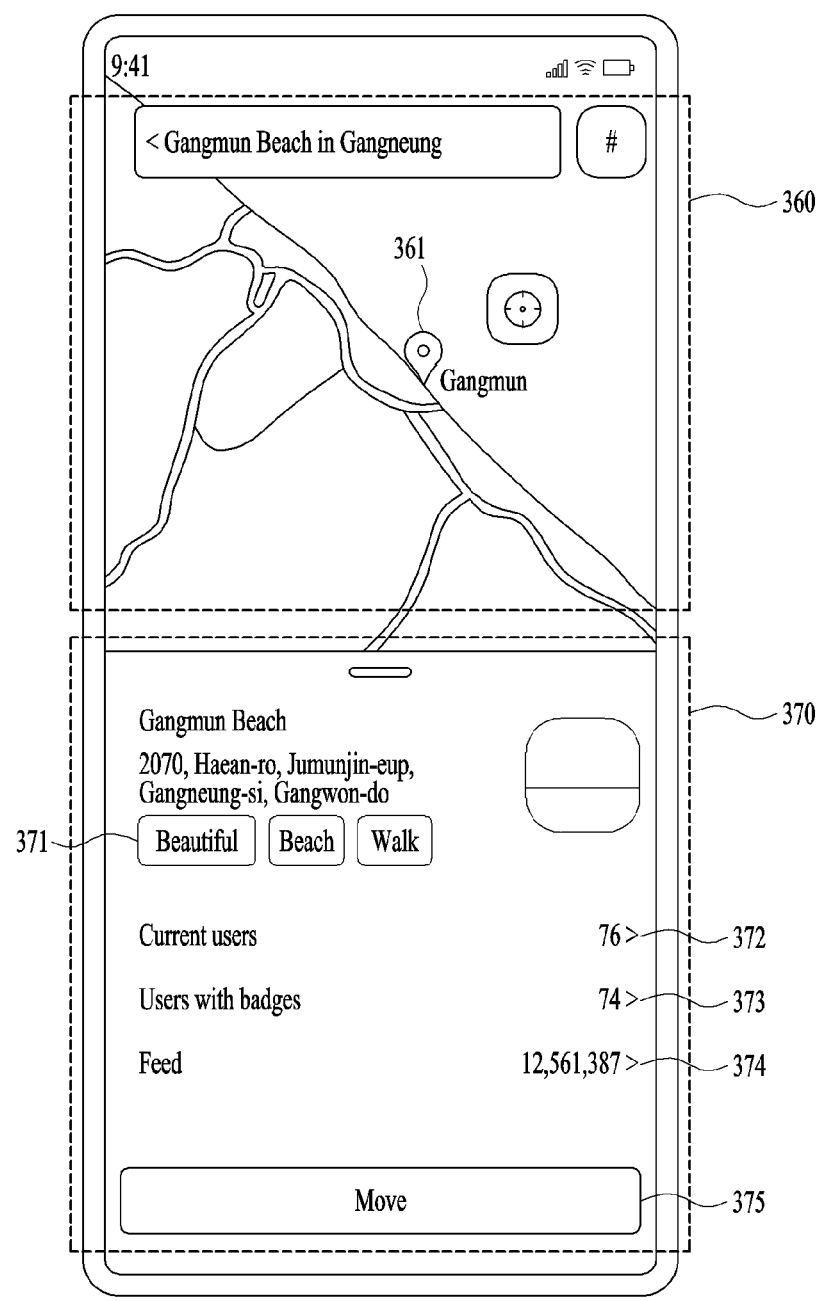

FIGS. 3A to 3C are diagrams illustrating a place selection operation according to various embodiments.

The street view of a specific place according to an embodiment may be determined based on a user's selection for a place. That is, the server may receive a place selection signal from the user terminal. The user terminal may output various place selection screens to the display in order to transmit the place selection signal to the server. The place selection may include at least one of a first place selection based on map information, a second place selection based on a place search, a third place selection based on a search record, or a fourth place selection based on a keyword search.

FIG. 3A shows a place search screen 300, a place search object 310, and a place keyword object and interest keyword object 320. The fourth place selection may include a place selection based on the place keyword object and interest keyword object 320. The place search object 310 may refer to an object to which the user may input a place name (e.g., a search box). The place keyword object may be a place-related object that the server recommends to the user based on a search record and/or interest keyword information of the user. When an input for the place keyword object is received, the server may transmit street view-related data of a corresponding place to the user terminal. For example, the place keyword object may be displayed in boxes as shown in FIG. 3A and may include Jebi coffee shop, Incheon International Airport, and the like. The interest keyword object may be a keyword-related object that the server recommends to the user based on the interest keyword information. When the input for the interest keyword object is received, the server may transmit list-related data for at least one place corresponding to the interest keyword information to the user terminal.

FIG. 3B shows the place search object 310, a recommended place object 340, and a place search record 350. The place search object 310 may include an object for receiving a place name input from the user. The user terminal may receive an input of a place name through the place search object 310 and transmit a place selection signal to the server. In this case, the place selection may be the second place selection based on the place search. The place search record 350 may be a record of a user's search for a place in the past. The third place selection may be a selection based on the search record 350. Through this, the user may easily access the place that the user has searched for in the past. For example, the user may select Gangmun Beach in Gangneung, that the user has searched for in the past, from the search record. The number of current users 351 in the place may be displayed next to the place name. For example, this may imply that 6,258 users are currently connected at Gangmun Beach in Gangneung. The recommended place object 340 may refer to an object for moving to a place that is arbitrarily selected by the server. In some cases, the user may want to have a chat with someone in the virtual space but may not determine a desired place. In this case, the server may arbitrarily determine a place for the user and allow the user to move to the corresponding place. For example, the recommended place object 340 may be displayed on the screen as accidental discovery.

FIG. 3C shows a 2D map 360, a place Gangmun Beach 361, place information 370, a place keyword 371, a number of current users 372, a number of owners of authentication information 373, a number of content views 374, and a place movement object 375. The 2D map 360 may refer to a map displayed two-dimensionally, and may be, for example, a bird's eye view map. The map information may include information on the 2D map. Therefore, the first place selection may include a user's selection for a place on the 2D map. The place Gangmun beach 361 may be displayed as a pin on the 2D map 360. When a selection input for the place Gangmun Beach 361 is received, the user terminal may output the place information 370 corresponding to the place Gangmun Beach 361 to the display. At this time, the user terminal may receive the place information 370 from the server and output the place information 370 to the display.

The place information 370 may include the place keyword 371, the number of current users 372, the number of owners of authentication information 373, the number of content views 374, and/or the place movement object 375. The place keyword 371 may be a keyword representing a corresponding place. For example, when the place is Gangmun Beach, the keywords may be "beautiful," "beach," and "walk". The authentication information may include information for authenticating information on a specific account with high reliability. In FIG. 3C, the authentication information may be expressed as a badge. A person who has the badge may imply that the person has received authentication for a specific badge. For example, a person who has a lawyer badge may imply that the person has received authentication for his or her job as a lawyer. The content views according to an embodiment may correspond to a feed in FIG. 3C. The content views may be a screen displaying at least one content (e.g., a photo, video, or text) uploaded by the plurality of accounts. The accounts may tag places when uploading contents. Therefore, the number of content views 374 may refer to the number of times that the corresponding place is tagged.

Figure 4:
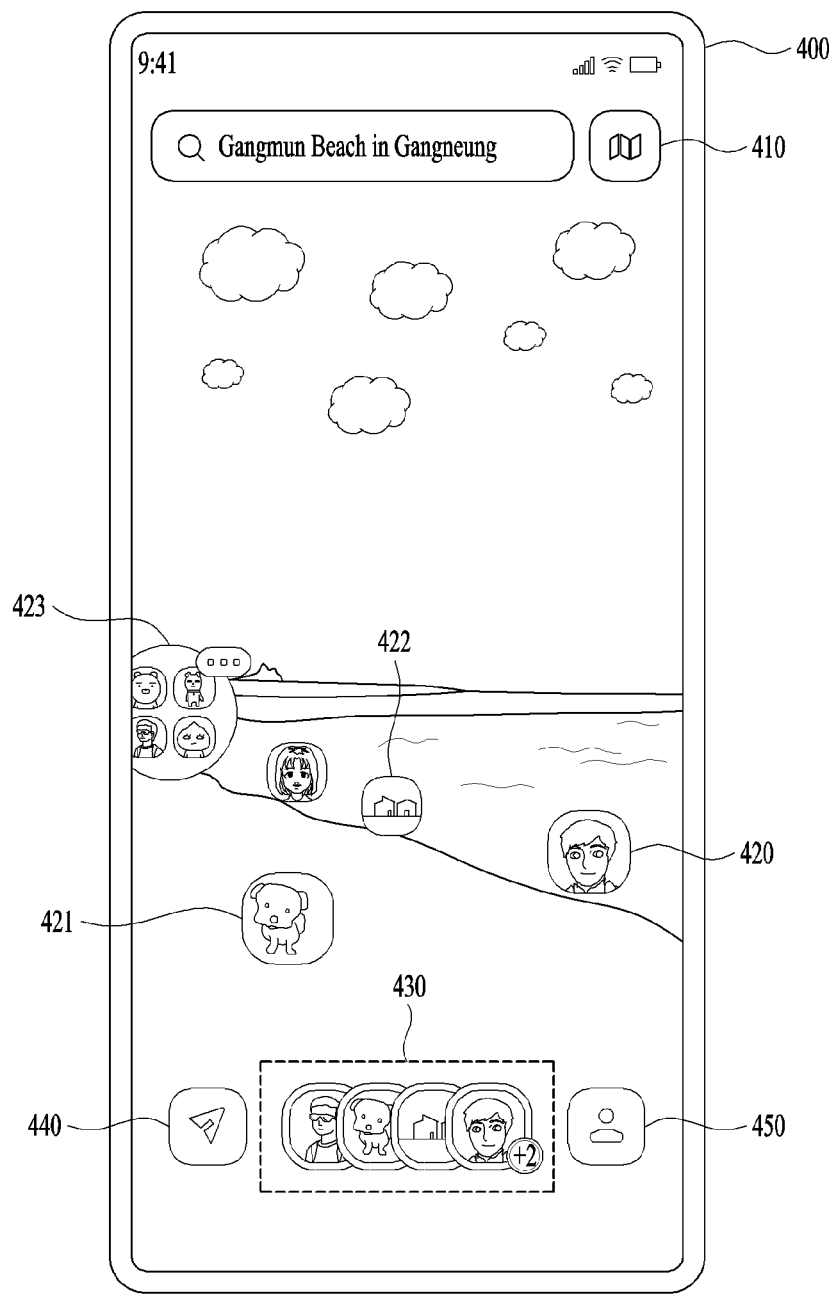
FIG. 4 is a diagram illustrating a street view according to an embodiment.

FIG. 4 is a diagram illustrating a street view according to an embodiment.

FIG. 4 shows a street view 400, a 2D map conversion object 410, first accounts 420, 421, 422, and 423, second accounts 430, another account invitation object 440, and a profile view object 450.

The street view 400 may include at least one of the 2D map conversion object 410, at least one of the first account 420, 421, 422, or 423 determined based on the location information, at least one of the second accounts 430 determined based on the interest keyword information, the other account invitation object 440, or the profile view object 450. The 2D map conversion object 410 may include an object for outputting the 2D map to the screen of the user terminal. The user may want to move from a place corresponding to the current street view to another place. In this case, the user may select another place to move to on the 2D map by selecting the 2D map conversion object. In this case, the 2D map may be the 2D map shown in FIG. 3C.

The first accounts 420, 421, 422, and 423 may be determined based on the location information. For example, the first accounts 420, 421, 422, and 423 may include accounts (an account 2 (420), an account 3 (421), and an account 4 (422)) close to an account 1 with respect to the location of the account 1 in the virtual space. In another example, there may be 1,000 accounts close to the account 1 with respect to the location of the account 1 in the virtual space. However, the number of accounts that may be displayed in the street view may be limited to 10. In this case, the server may determine ten accounts for the first accounts to be displayed on the street view of the account 1 in order of the distance close to the account 1 in the virtual space. The first accounts may include only accounts, of which distances in the virtual space with respect to the location of the account 1 in the virtual space are within 100 m.

The plurality of accounts 423 may be collected and displayed based on the location of the account 1 in the virtual space. The plurality of accounts 423 may include accounts participating one chatroom. The plurality of accounts 423 may refer to accounts currently having a chat in the chatroom. The screen according to an embodiment may display only at least some accounts among the plurality of accounts participating in one chatroom. For example, if ten accounts are participating in the chatroom, only four accounts may be displayed. According to another embodiment, the accounts 423 that are separated from the account 1 in the virtual space by a predetermined distance or more may be collected and displayed. When a selection input for the accounts 423 separated by the predetermined distance or more is received, the server may transmit, to the user terminal, a list of the corresponding accounts and/or location information that is necessary for the account 1 to move to the location of the corresponding accounts.

The second accounts 430 may include an account determined based on the interest keyword information. The interest keyword information may be information on an interest keyword selected by the corresponding account. The server may determine an account having the same interest as the corresponding account based on the interest keyword information. For example, when the interest keyword of the account 1 is "sea," the server may determine other accounts having the same keyword as "sea," which is the interest keyword of the account 1, as the second accounts 430.

When a selection input signal for one of the first accounts and/or second accounts is received from the user terminal, the server may transmit account information for the corresponding account to the user terminal. The user terminal may output information on an account selected by the user to the display based on the account information.

The other account invitation object 440 may include an object for inviting another account to a place where the corresponding account currently exists. When a selection input for the other account invitation object 440 is received from the user terminal, the server may send an invitation message to a user terminal of the other account. In addition, the server may receive a message regarding whether to accept the invitation from the user terminal of the other account and transmit the message to the corresponding user terminal.

The profile view object 450 may include an object for moving to a profile view of the corresponding account. When a selection input for the profile view object 450 is received, the server may transmit profile view-related data of the corresponding account to the user terminal. According to another embodiment, when the user terminal receives the selection input for the profile view object, the profile view may be output through the display of the user terminal based on the profile view-related data stored in a memory of the user terminal.

Figure 5:
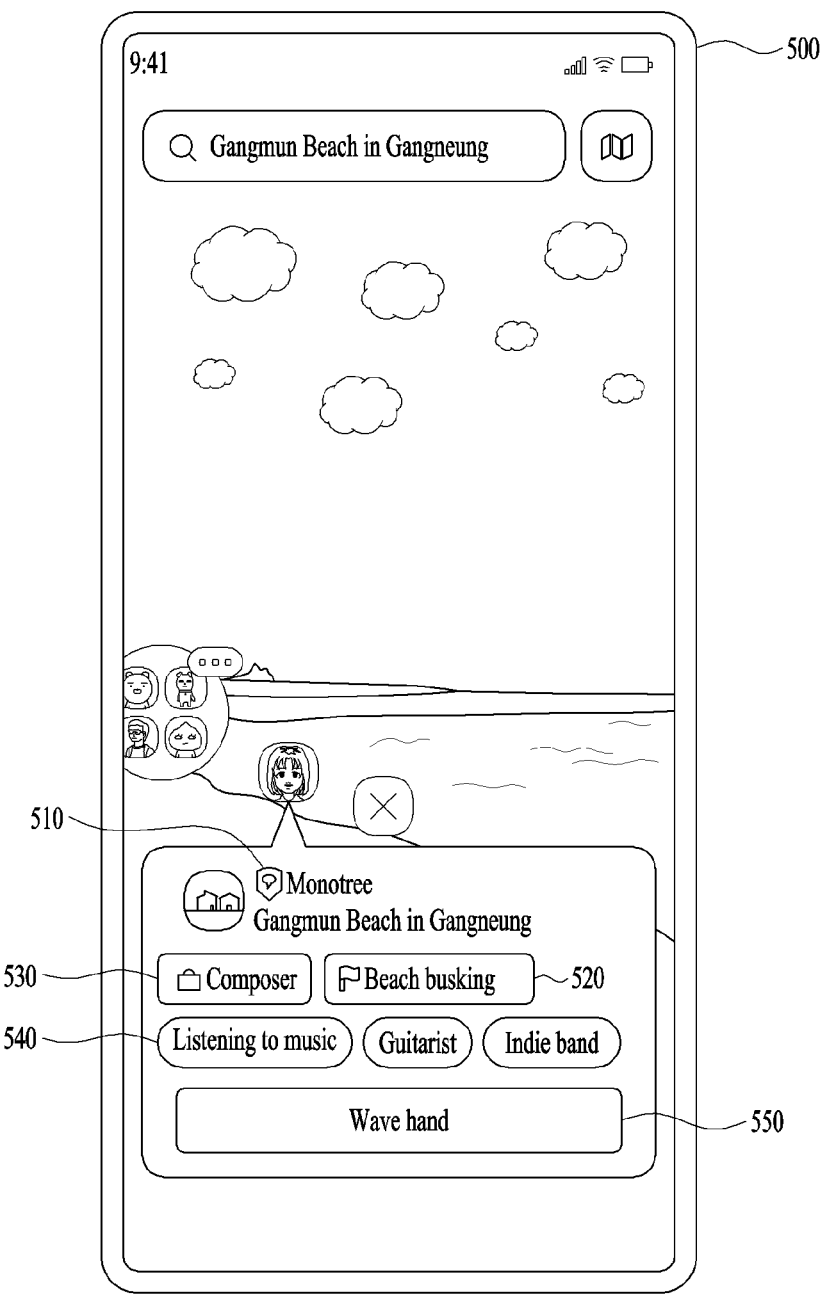
FIG. 5 is a diagram illustrating a process of transmitting a chat request according to an embodiment.

FIG. 5 is a diagram illustrating a process of transmitting a chat request according to an embodiment.

FIG. 5 shows identity authentication information 510, place authentication information 520, job authentication information 530, matching interest keyword information 540, and a chat request object 550.

The identity authentication information 510 may include information indicating that the identity of the corresponding account has been authenticated. The server may authenticate the identity of the corresponding account by a method capable of authenticating the identity of the user, such as an identification card or a certificate. Through this, the server may provide a chat service between verified users.

The job authentication information 530 may include information indicating that the job of the corresponding account has been authenticated. For example, the job authentication information 530 may include that the fact that the job of the corresponding account is a composer has been authenticated.

The place authentication information 520 may include information indicating that the authentication of characteristics of a place has been completed. For example, in a case where the characteristic of the place is "beach busking," when a plurality of accounts (e.g., at least ten accounts) authenticated for the characteristic, the server may generate the authentication information, "beach busking," for the place. In another example, in a case where the characteristic of the place is a "popular restaurant," when the plurality of accounts (e.g., at least ten accounts) authenticate for the characteristic, the server may generate the authentication information, "popular restaurant," for the place.

The place authentication information 520 may include information indicating that the authentication has been completed based on user usage data. The user usage data may include data for proving that a user has visited and used a corresponding place. For example, the user usage data may include a receipt. For example, in a case where the characteristic of the place is the "popular restaurant," when the plurality of accounts has completed the authentication for the characteristic using a receipt indicating a visit to the place, the server may generate the authentication information, "popular restaurant" for the corresponding restaurant. In another example, in a case where the place is in a situation where it is difficult to receive a receipt, such as "sea," the server may authenticate the place using usage data for a store around the corresponding place. When the place is the "sea (e.g., Gangmun Beach)," the server may generate the place authentication information using a "receipt from a store near the beach" as the user usage data.

The matching interest keyword information 540 may be determined based on whether interest keyword information of a specific account matches interest keyword information of an account selected on the street view 500. The interest keywords of the specific account may be "listening to music," "guitarist," "indie band," "nature," and "concerts," and the interest keywords of the selected account may be "listening to music," "guitarist," "indie band," "crowded," and "food alley." Among them, the matching interest keywords may be "listening to music," "guitarist," and "indie band". The server may determine how well a user of the specific account is able to communicate with a user of the selected account by using the matching interest keyword information 540.

The first user terminal may receive a selection input for the chat request object 550 and transmit a chat request signal to the server based on the selection input. The server may receive a selection input signal for another account displayed on the street view from the user terminal. The server may transmit account information corresponding to the selected account to the first user terminal. The user terminal may display account information corresponding to the selected account and may display the chat request object 550 for starting a chat with the corresponding account. For example, the chat request object 550 may be expressed by the waving of the hand. The waving of the hand may refer to a motion of a person to start a chat. The server may receive a chat request for the selected account from the first user terminal.

Figure 6A:
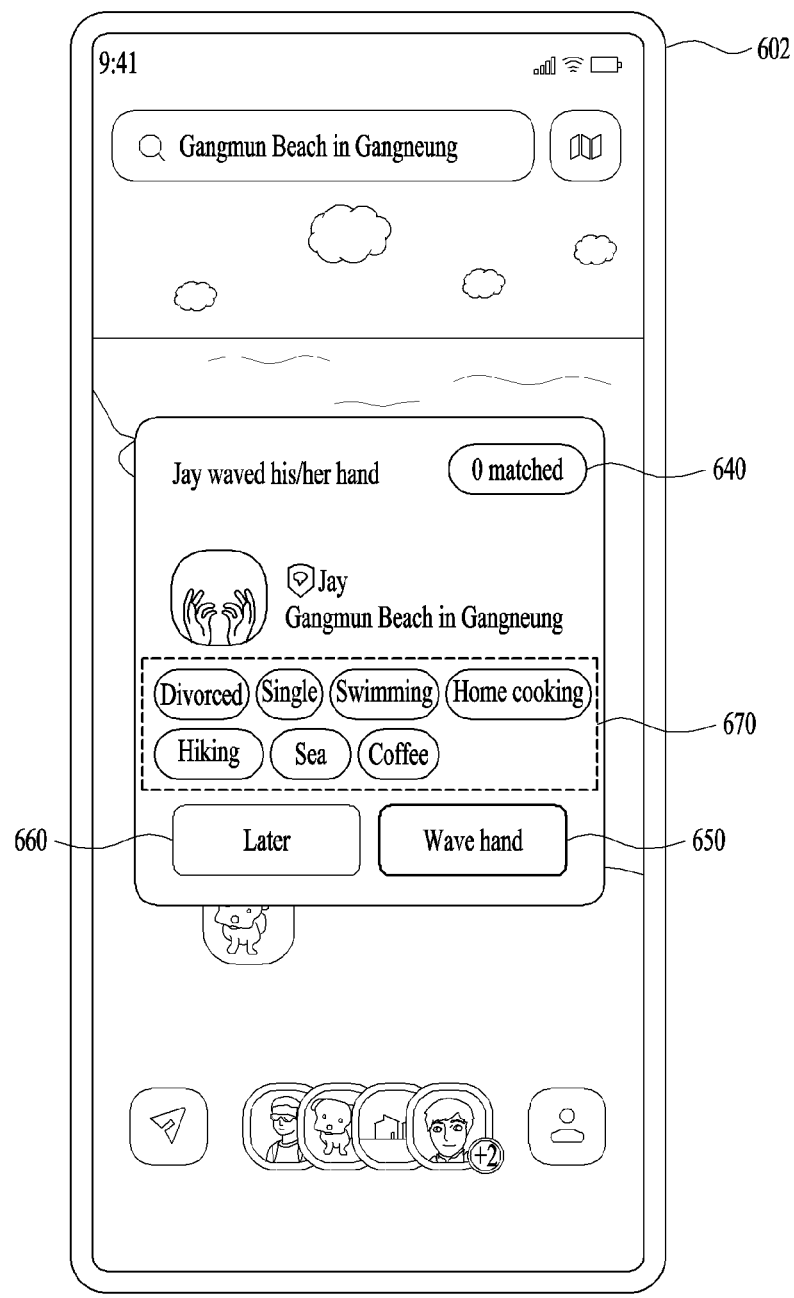
FIGS. 6A to 6C are diagrams illustrating an operation of establishing a conversation between different accounts according to an embodiment.
Figure 6B:
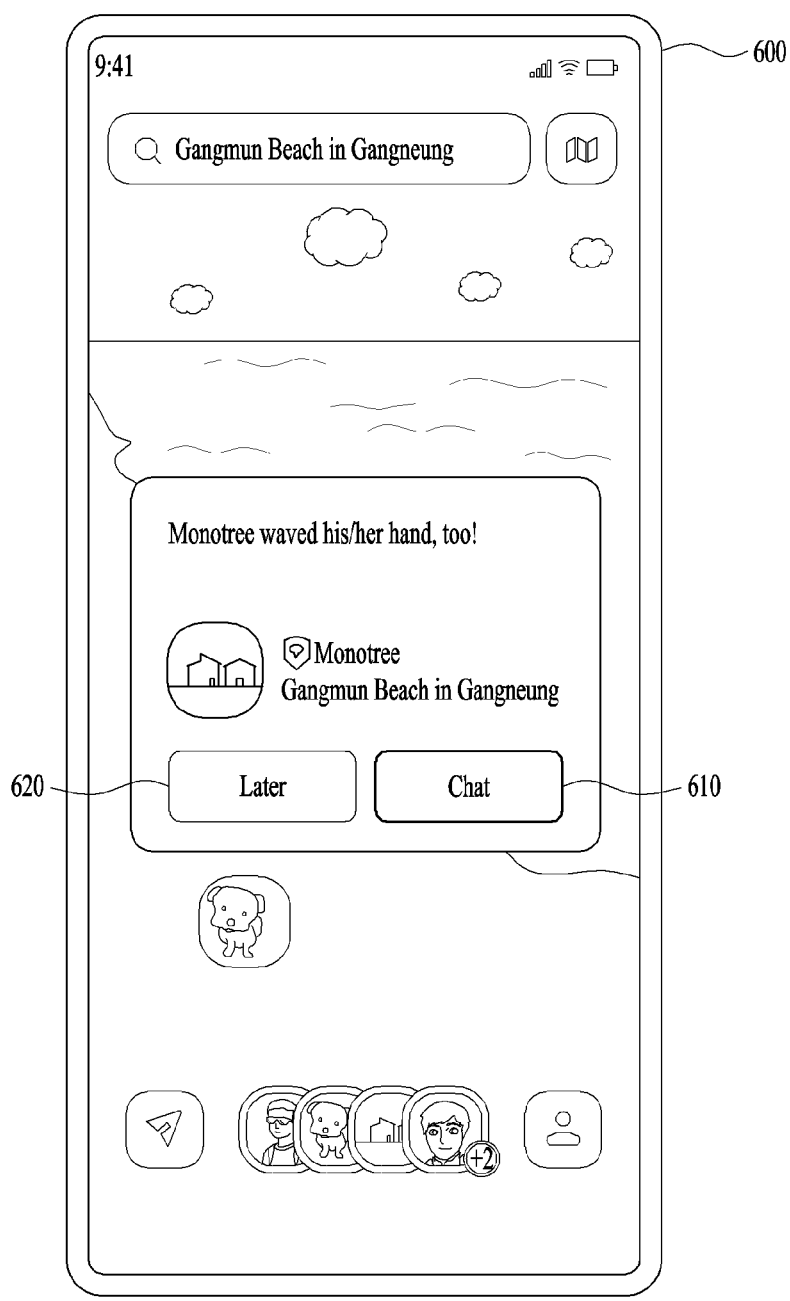
Figure 6C:
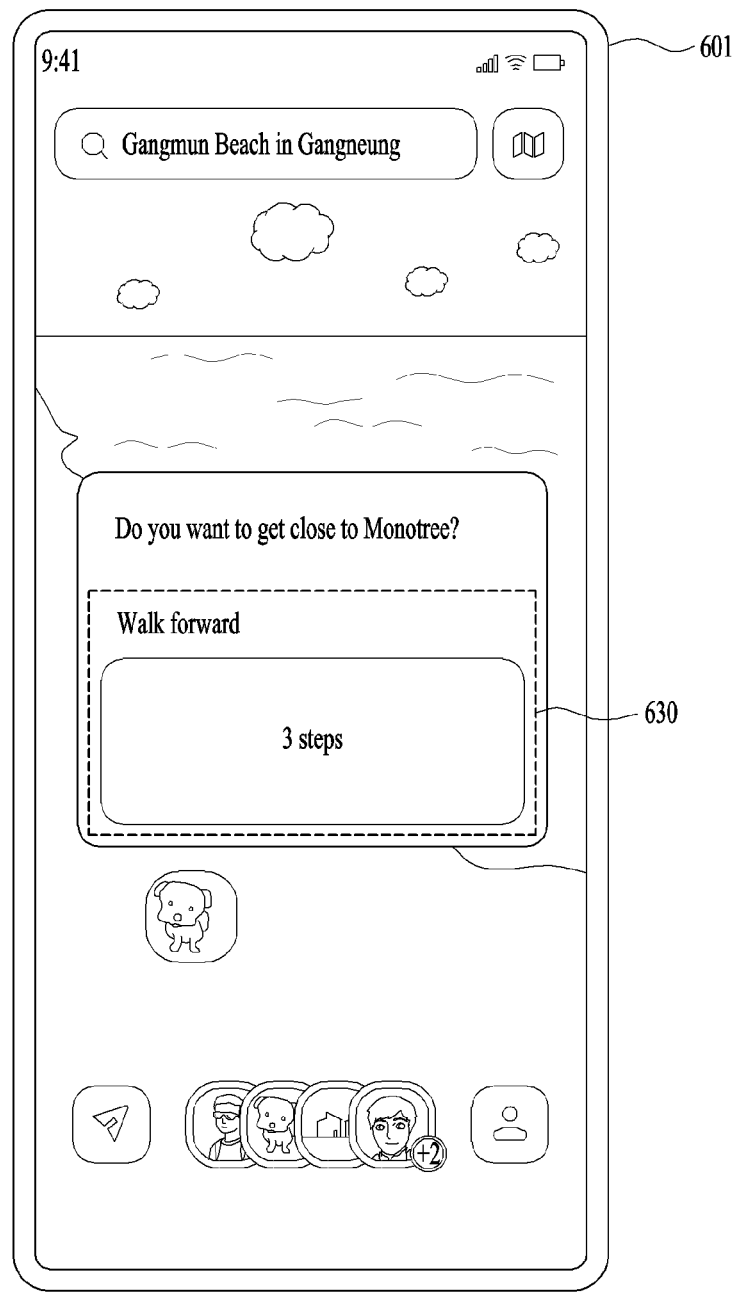

FIGS. 6A to 6C are diagrams illustrating an operation of establishing a conversation between different accounts according to an embodiment.

FIG. 6A may show a chat request reception screen 602, FIG. 6B may show a chat request reception screen 600 received from a partner account in a situation where the partner account has accepted the chat request, and FIG. 6C may show a quest progress screen 601.

The second user terminal may receive the chat request from the first user terminal. In this case, the second user terminal may output the chat request reception screen 602 through the display. FIG. 6A may show the chat request reception screen 602. FIG. 6A shows a number of matching interest keywords 640, a chat acceptance object 650, a chat rejection object 660, and/or interest keyword information 670.

The number of matching interest keywords 640 may include information on the number of matching interest keywords between interest keywords of an account of the second user terminal, which has received the chat request from the first user terminal, and interest keywords of the first user terminal. This may allow to know how many the user of the first user terminal, which has transmitted the chat request, has the matching interests with the user of the second user terminal, and the user of the second user terminal may determine whether to accept the chat through this operation.

The chat request reception screen 602 may include the interest keyword information 670 of the account of the first user terminal that has transmitted the chat request. For example, the interest keyword information of the account of the first user terminal, which has transmitted the chat request, may include divorced, single, swimming, home cooking, hiking, sea, and coffee.

The user of the second user terminal may reject the chat using the chat rejection object 660 in response to the chat request of the first user terminal. In addition, the user of the second user terminal may accept the chat using the chat acceptance object 650 in response to the chat request of the first user terminal.

FIG. 6B shows a screen of the first user terminal in a case where the user of the second user terminal has accepted the chat after the user of the first user terminal transmitted the chat request to the user of the second user terminal. The chat request reception screen 600, received from the partner account in a situation where the partner account has accepted the chat request, may be a screen of a user terminal corresponding to an account, which has transmitted the chat request, in a case where the chat request is transmitted to the partner account and the partner account has accepted the chat request. In this case, the user of the first user terminal that has transmitted the chat request may reject the chat (620) or accept the chat (610) to start the chat.

The quest progress screen 601 in FIG. 6C may be a screen displaying a quest that the user of the first user terminal needs to perform to start a chat with the user of the second user terminal.

When the predetermined condition is not satisfied, the server may transmit quest information for satisfying the predetermined condition to the first user terminal. According to another embodiment, the determining whether the predetermined condition is satisfied may also be performed on the user terminal. For example, the account of the first user terminal and the account of the second user terminal in the virtual space may be too far from each other to start a chat. In this case, the server may transmit the quest information to the first user terminal. The quest may include a quest that induces the account of the first user terminal to move on the street view so that a distance between the account of the first user terminal and the account of the second user terminal on the street view is decreased to a predetermined distance or less. In this case, the user of the first user terminal may have to actually take "3 steps" forward according to a quest 630 displayed on the screen. When a quest completion signal based on the quest information is received from the first user terminal, the server may provide the chat service. For example, when the user of the first user terminal actually takes "3 steps" forward according to the quest 630 displayed on the screen, the first user terminal may transmit the quest completion signal to the server.

Figure 7A:
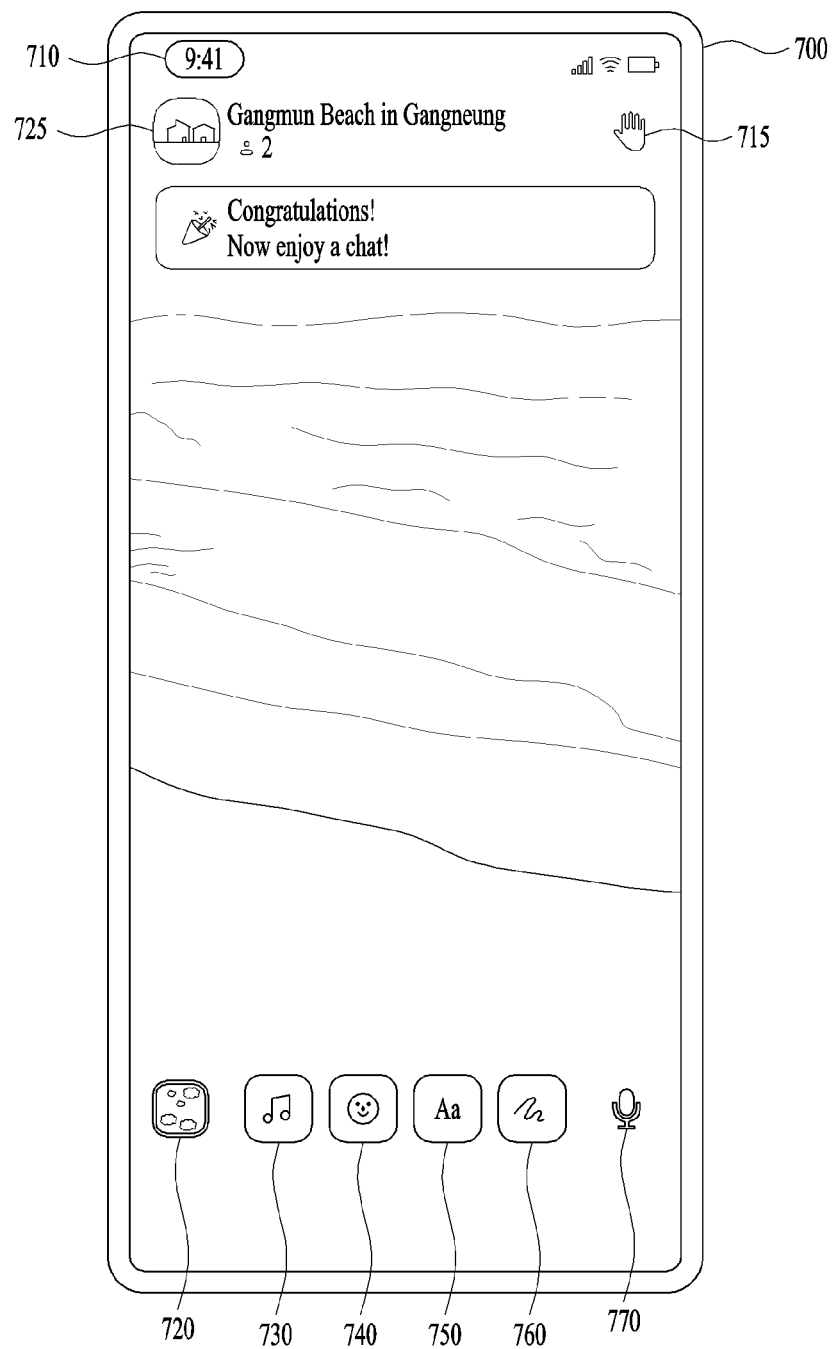
FIGS. 7A and 7B are diagrams illustrating chat windows according to an embodiment.
Figure 7B:
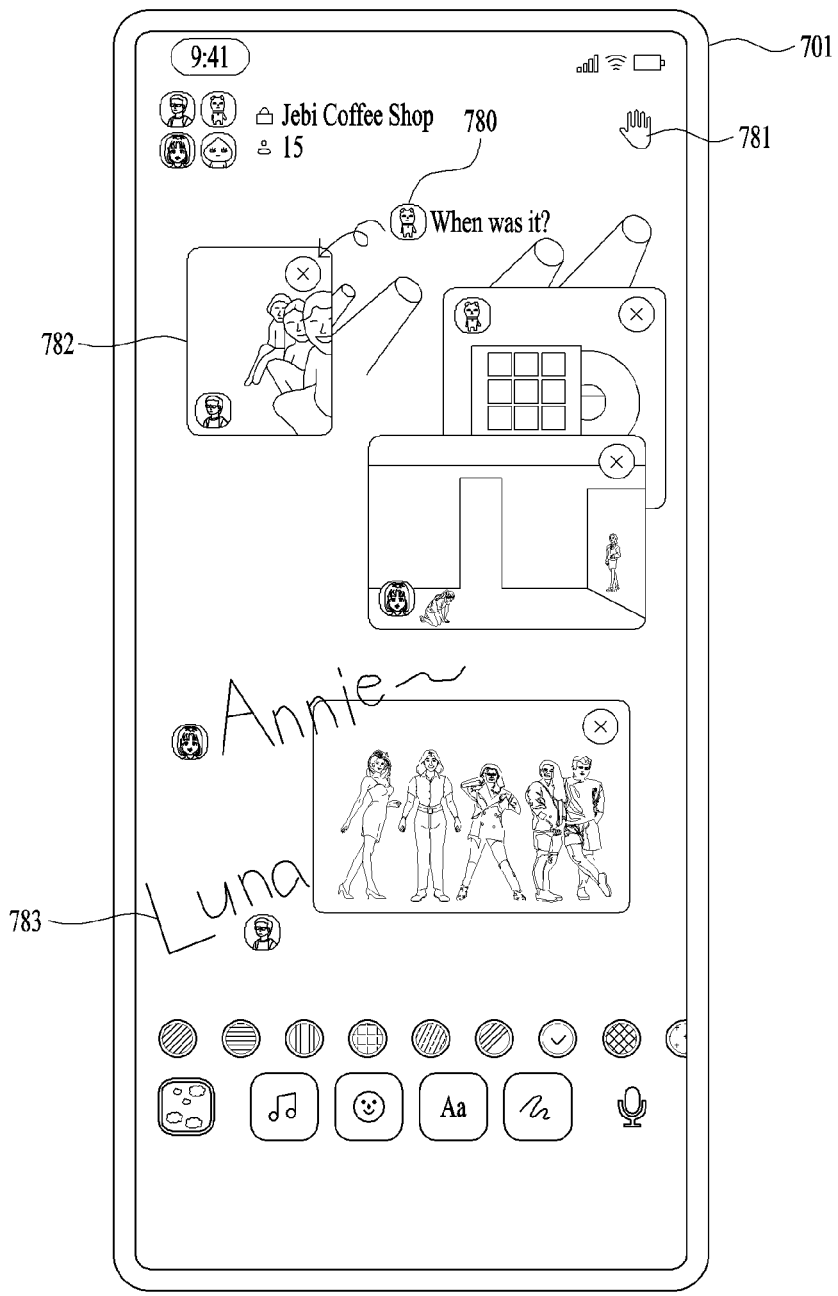

FIGS. 7A and 7B are diagrams illustrating chat windows according to an embodiment.

FIG. 7A may show a chat window 700 having perspective image information as a background and FIG. 7B may show a chat window 701 having a content as a background.

The chat window may include a screen displayed on user terminals for a chat between users. The server may provide all of a text-based chat, voice-based chat, and image-based chat between users using the chat window. The chat window 700 may include at least one of a chat progress state information display object 710, a chat start notification object 715, an image selection object 720, a profile object 725, a music sharing object 730, an emoticon input object 740, a text input object 750, a drawing input object 760, or a voice input object 770.

The chat progress state information display object 710 may include an object for displaying information indicating that a chat has started. For example, when the chat has started, the color of the chat progress state information display object 710 may change from green to blue.

The chat start notification object 715 may be an object for notifying the user that the chat has started.

The image selection object 720 may be an object for sharing an image (e.g., a photo or video) with other accounts in a chatroom. For example, the image may include an image stored in the memory of the user terminal, an image immediately taken by the user, an image obtained from the Internet, or the like.

The profile object 725 may include a profile related to a place and/or an account profile. The profile object 725 may be displayed differently while a user's voice is being output through the user terminal. For example, a border of a profile object may appear and the border may be expressed in various colors. The user of the output voice may be changed. In this case, the profile object 725 may be changed to an account profile of a corresponding user.

The music sharing object 730 may be an object for the user of the user terminal to share music with other accounts in the chatroom.

The emoticon input object 740 may refer to an object for inputting an emoticon.

The text input object 750 may refer to an object for inputting a text.

The drawing input object 760 may refer to an object for inputting a drawing. For example, the drawing may refer to a drawing drawn by a user using an input device (e.g., a touch pen).

The voice input object 770 may include an object for determining whether to transmit a user's voice to other user terminals. For example, when the voice input object is in an ON state, the user's voice may be transmitted to the other user terminals, and when the voice input object is in an OFF state, the user's voice may not be transmitted to the other user terminals.

FIG. 7b may show the chat window 701 having a content as a background, and a content sharing account profile 780, a chat end object 781, a shared image 782, and an input drawing 783.

One of the accounts included in the chat window according to an embodiment may share its own content through the chat window. In this case, the profile 780 of the account that shared its own content may be displayed in the chat window. Also, one of the accounts included in the chat window may share its own image through the chat window, and the shared image 782 may be displayed in the chat window. One of the accounts included in the chat window may share a drawing input by itself through the chat window, and the input drawing 783 may be displayed in the chat window.

The chat window may include a chat window having, as a background, an image displayed based on at least one of image information of a perspective view or shared content information. The background of the chat window may be determined based on perspective view image information. For example, the perspective view image information may be image information on Gangmun Beach in Gangneung. In this case, the background of the chat window may be Gangmun Beach in Gangneung. The background of the chat window may be determined based on a content shared by an account included in the chat window. For example, the content selected by the account included in the chatroom may be a concert hall. In this case, the background of the chat window may be the concert hall.

Figure 8:
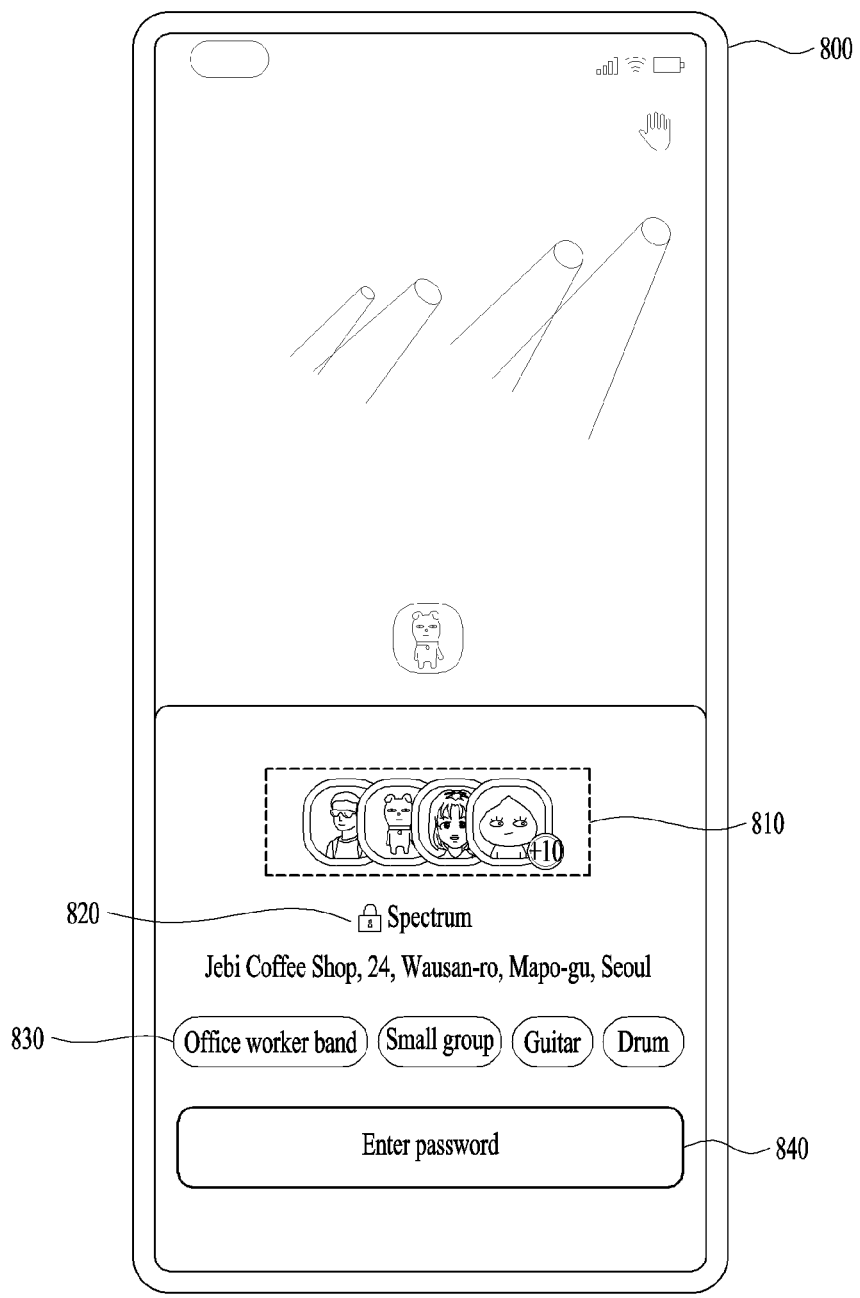
FIG. 8 is a diagram illustrating a private chat service according to an embodiment.

FIG. 8 is a diagram illustrating a private chat service according to an embodiment.

FIG. 8 shows accounts participating in a private chat 810, a private chat display object 820, a private chat keyword 830, and a private chat participating object 840.

The private chat service may be a chat service in which only accounts satisfying a predetermined condition are able to participate. The predetermined condition may include at least one of a place condition or a password condition. The user who wants to participate in the private chat may be required to input a password. The place condition may be a condition regarding a place for having the private chat. For example, the place condition may include a condition that the private chat is possible only in a place where people can sit, such as a bench or a chair.

The private chat display object 820 may include an object for showing a mark indicating that the corresponding chatroom is the private chatroom, unlike a general chatroom. The private chat keyword 830 may be a keyword capable of describing the characteristics of the private chat. For example, the private chat keyword 830 may be office worker band, small group, guitar, drum, and vocal. The private chat participating object 840 may be an object for participating in the private chatroom. For example, the private chat participating object 840 may be expressed as a password input.

Figure 9:
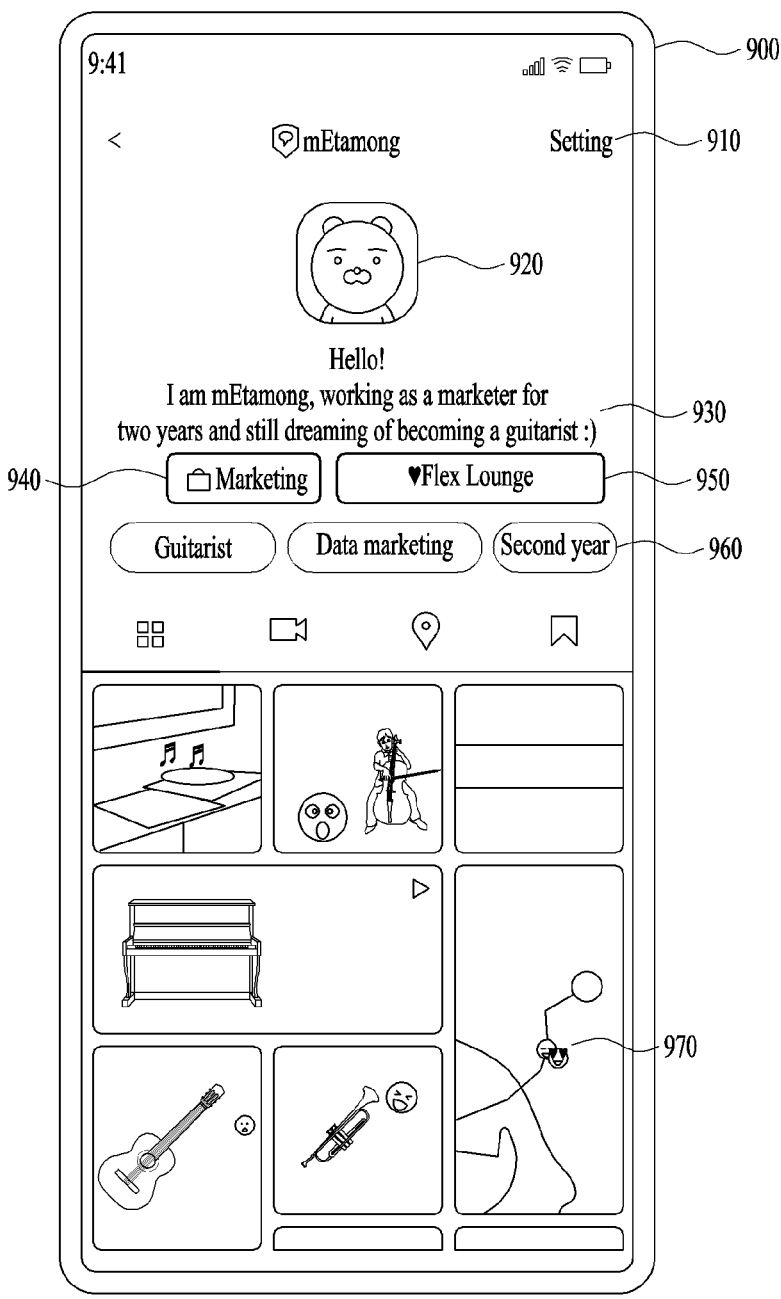
FIG. 9 is a diagram illustrating a profile view according to an embodiment.

FIG. 9 is a diagram illustrating a profile view 900 according to an embodiment.

FIG. 9 shows a profile setting object 910, a profile image 920, a status message 930, job authentication information 940, place authentication information 950, interest keyword information 960, and uploaded contents 970.

The profile setting object 910 may include an object for correcting account information. When a selection input for the profile setting object 910 is received, the user terminal may output a screen for correcting the profile image 920, the status message 930, the job authentication information 940, the place authentication information 950, the interest keyword information 960, and the uploaded contents 970.

The account information may be information on an account and may include at least one of identity authentication information, the job authentication information 940, the place authentication information 950, or the interest keyword information 960. The status message 930 may be a message input by a user. For example, the status message 930 may include a self-introduction, a message regarding a current status, and the like. The identity authentication information may include information indicating that the identity of the corresponding account has been authenticated. The job authentication information 940 may include information indicating that the job of the corresponding account has been authenticated. The place authentication information 950 may include information indicating that the authentication of characteristics of a place has been completed. The interest keyword information 960 may include information on interests of the corresponding account. The uploaded contents 970 may include contents uploaded by a user of the profile view. For example, the uploaded contents 970 may include images, videos, texts, tags, etc. uploaded by the user of the profile view.

Figure 10:
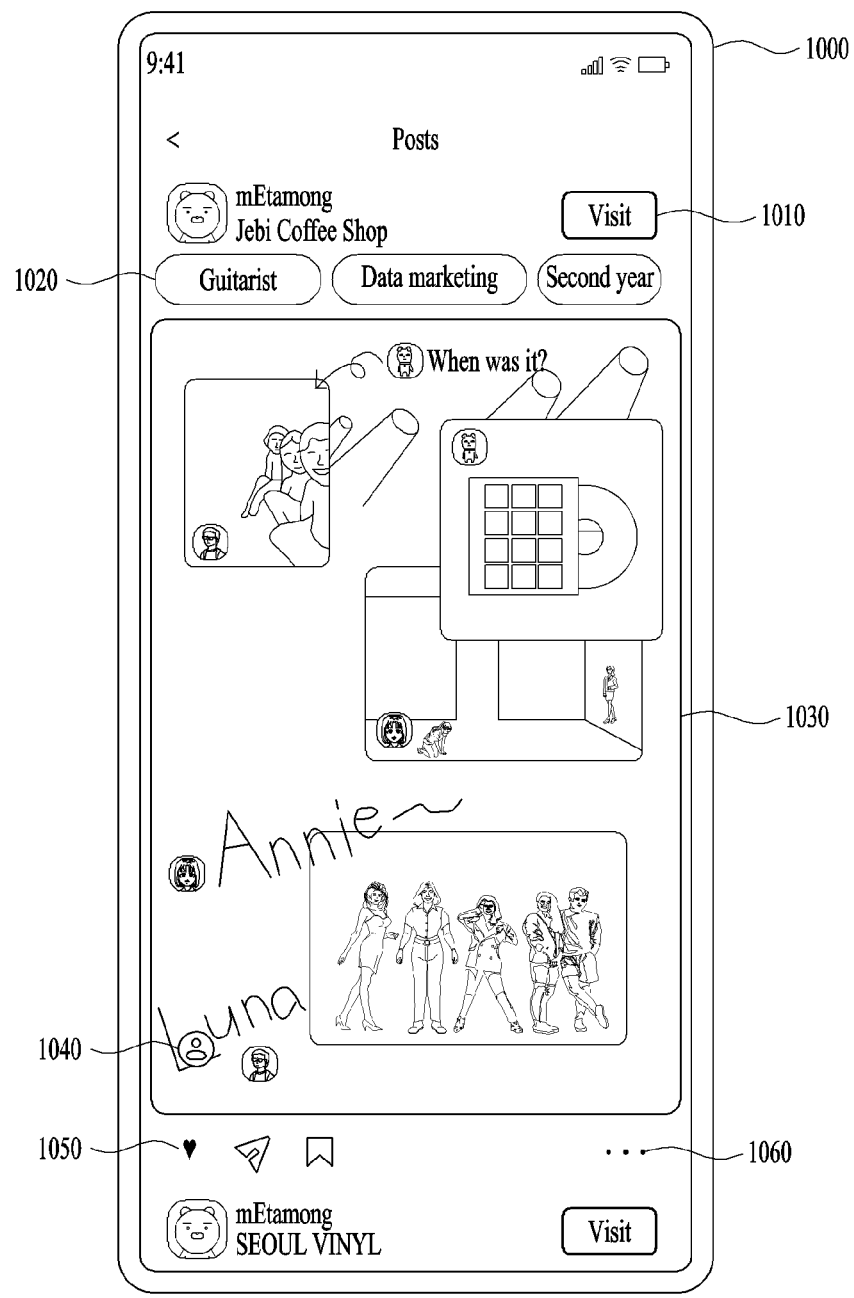
FIG. 10 is a diagram illustrating a content view according to an embodiment.

FIG. 10 is a diagram illustrating a content view 1000 according to an embodiment.

FIG. 10 shows a place movement object 1010, interest keyword information 1020, a place captured image 1030, an account list 1040, a response object 1050, and an opening determination object 1060. The content view 1000 may include at least one of the place movement object 1010, the interest keyword information 1020, the place captured image 1030, the account list 1040, the response object 1050, or the opening determination object 1060. The place movement object 1010 may be an object for moving to a place corresponding to the content view. For example, the place corresponding to the content view may be a convert hall. When an input signal for the place movement object 1010 is received from the user terminal, the server may transmit data related to the concert hall to the user terminal. Through this, the user terminal may output a screen for the concert hall, which is a virtual space. The interest keyword information 1020 may include an interest keyword corresponding to the content view. The interest keyword information 1020 may include interest keywords of the account at the time of visiting the place corresponding to the content view. For example, the place corresponding to the content view may be a concert hall. The interest keywords of the account at the time of visiting the concert hall may be a guitarist, data marketing, 2nd year, and name of a band I am interested in. The place captured image 1030 may be an image obtained by capturing at least a portion of the virtual space. For example, when the place corresponding to the content view is a concert hall, the place captured image 1030 may include an image obtained by capturing at least a portion of the concert hall expressed as the virtual space. The account list 1040 may include a list of accounts captured from the street view. For example, in a case of the street view of the concert hall, the account list 1040 may be a list of accounts having the concert hall as the background and participating in the concert hall. The response object 1050 may be an object for displaying a preference for the content view. The response object 1050 may be expressed in various forms such as, for example, likes. The opening determination object 1060 may include an object capable of setting the opening of the uploaded content to other accounts or the keeping of the uploaded content private.

Figure 11:
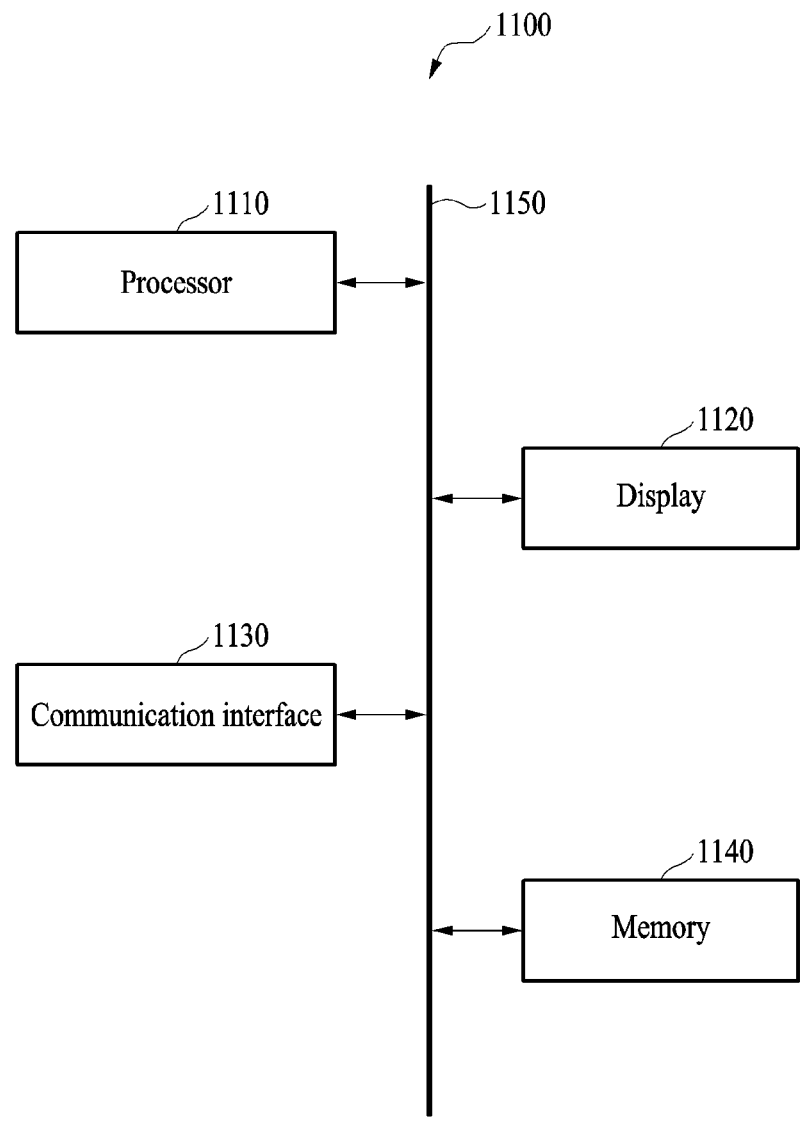
FIG. 11 is a block diagram illustrating an electronic device for providing a chat service in a map-based virtual space according to various embodiments.

FIG. 11 is a block diagram illustrating an electronic device for providing a chat service in a map-based virtual space according to various embodiments.

Referring to FIG. 11, an electronic device 1100 may include a processor 1110, a memory 1140, a communication interface 1130, a communication bus 1150, and a display 1120. The processor 1110, the memory 1140, the communication interface 1130, and/or the display 1120 may connect to one another through the communication bus 1150. In the electronic device 1100 shown in FIG. 11, some components may be omitted or other components may be added. The electronic device 1100 may correspond to a server and may include user terminals (e.g., a smartphone, personal computer (PC), tablet PC, etc.) according to an embodiment.

The electronic device 1100 may include a device for providing the chat service in the map-based virtual space described above. The processor 1110 may perform operations of at least one of the methods described with reference to FIGS. 1 to 10. For example, the processor 1110 may perform each operation for providing the chat service in the map-based virtual space described above. According to an embodiment, the processor 1110 may store data for performing operations of the method of providing the chat service in the map-based virtual space and/or data generated by performing the operations of the method of providing the chat service in the map-based virtual space in the memory 1140 or an external database accessible from the electronic device 1100.

The memory 1140 may store information related to the chat service in the map-based virtual space described above and may store data generated according to the execution of an operation of the processor 1110. The memory 1140 may include, for example, a volatile memory or a non-volatile memory.

The electronic device 1100 may be connected to an external device (e.g., a user terminal or a network) through the communication interface 1130 to exchange data with the external device. For example, the electronic device 1100 may receive a chat request through the communication interface 1130 and receive information on whether to accept the chat. Also, for example, the electronic device 1100 may provide the street view to the user terminal through the communication interface 1130.

According to an embodiment, the memory may store a program in which the method of providing the chat service in the virtual space described above is implemented. The processor may execute a program stored in the memory and may control the device. Program code to be executed by the processor may be stored in the memory.

The display 1120 may generate a driving signal by converting an image signal, a data signal, an on-screen display (OSD) signal, and a control signal processed by the processor 1110. The display may be implemented as a plasma display panel (PDP), a liquid crystal display (LCD), an organic light-emitting diode (OLED), a cathode ray tube (CRT), and a flexible display, and in addition, the display may be implemented as a 3D display. In addition, the display may be used as an input device as well as an output device by being configured as a touchscreen.

The embodiments described herein may be implemented using a hardware component, a software component and/or a combination thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. A method of providing a chat service in a map-based virtual space, the method comprising:
   receiving at least one of a place selection signal based on map information or a motion detection signal and interest keyword information from a first user terminal;
   transmitting, to the first user terminal, data of a street view based on at least one of the place selection signal or the motion detection signal corresponding to a first account of the first user terminal;
   transmitting, to the first user terminal, a plurality of first accounts and a plurality of second accounts to be displayed separately on the street view;
   receiving a chat request from the first user terminal for requesting a chat with a second user terminal corresponding to the plurality of first accounts;
   receiving a result regarding whether to accept the chat in response to the chat request from the second user terminal;
   determining whether the first account of the first user terminal and a first account of the second user terminal on the street view satisfy a first selected condition;
   transmitting, to the first user terminal, quest information for satisfying the first selected condition; and
   providing the chat service between the first user terminal and the second user terminal in response to completing the quest information,
   wherein the plurality of first accounts is determined based on at least one of the place selection signal or the motion detection signal, and
   wherein the plurality of second accounts is determined based on the interest keyword information.

2. The method of claim 1, wherein the transmitting of the data of the street view to the first user terminal comprises:
   determining location information and field of view information of the first account of the first user terminal in the virtual space based on at least one of the place selection signal or the motion detection signal;
   determining image information of a perspective view to be displayed on the first user terminal based on the location information and the field of view information;
   determining one or more other accounts to be displayed on the first user terminal based on the location information, the field of view information, and location information of other accounts other than the first account of the first user terminal; and
   transmitting the image information and data of a street view based on the one or more other accounts to the first user terminal.

3. The method of claim 1, wherein a place selection of the place selection signal comprises at least one of a first place selection based on the map information, a second place selection based on a place search, a third place selection based on a search record, or a fourth place selection based on a keyword search.

4. The method of claim 1, wherein the street view comprises at least one of a two-dimensional (2D) map conversion object, at least one first account of the plurality of first accounts determined based on location information, at least one second account of the plurality of second accounts determined based on the interest keyword information, another account invitation object, or a profile view object.

5. The method of claim 1, wherein the motion detection signal comprises a signal determined based on at least one of a moving distance, a direction change, or a movement speed change of the first user terminal.

6. The method of claim 1, wherein the transmitting of the data of the street view to the first user terminal comprises:
   transmitting data for displaying a marketing content corresponding to at least one of a place and the interest keyword information on the street view.

7. The method of claim 2, wherein the determining of the location information and the field of view information comprises:
   determining the location information and the field of view information based on time information.

8. The method of claim 7, wherein the time information comprises information on one time point among a plurality of time points corresponding to a corresponding place.

9. The method of claim 1, wherein the receiving of the chat request comprises:
   receiving an input signal for selecting another account displayed on the street view;
   transmitting account information corresponding to the selected account to the first user terminal; and
   receiving the chat request for the selected account from the first user terminal.

10. The method of claim 9, wherein the account information comprises at least one of identity authentication information, job authentication information, place authentication information, or the interest keyword information.

11. The method of claim 1,
    wherein the providing of the chat service comprises providing the chat service through a chat window, and
    wherein the chat window comprises at least one of a chat progress state information display object, a chat start notification object, an image selection object, a music sharing object, an emoticon input object, a text input object, a drawing input object, or a voice input object.

12. The method of claim 11, wherein the chat window comprises a chat window having, as a background, an image displayed based on at least one of image information of a perspective view or shared content information.

13. The method of claim 1, wherein the providing of the chat service comprises:
    providing a private chat service in which only accounts satisfying a second selected condition are able to participate.

14. The method of claim 13, wherein the second selected condition comprises at least one of a place condition or a password condition.

15. The method of claim 1, wherein a profile view displayed on the first user terminal comprises at least one of a profile setting object, a profile image, a state message, job authentication information, place authentication information, the interest keyword information, or a content uploaded by the first user terminal.

16. The method of claim 1, wherein a content view displayed on the first user terminal comprises at least one of a place movement object, an interest keyword, a place captured image, an account list, a response object, or an opening determination object.

17. The method of claim 13, wherein the providing of the chat service comprises:
when the second selected condition is not satisfied, transmitting quest information for satisfying the second selected condition to the first user terminal; and
when a quest completion signal based on the quest information for satisfying the second selected condition is received from the first user terminal, providing the chat service.

18. The method of claim 17, wherein the quest information for satisfying the first selected condition comprises a quest for inducing the first account of the first user terminal on the street view to move so that the account of the first user terminal and the first account of the second user terminal on the street view are close to each other to have a selected distance or less.

19. The method of claim 13, wherein the second selected condition is determined based on a distance between the first account of the first user terminal and the first account of the second user terminal on the street view.

20. A non-transitory computer-readable storage medium storing instructions that, when executed by a processor, cause the processor to perform the method of claim 1.

21. A device for providing a chat service in a map-based virtual space, the device comprising:
a processor,
wherein the processor is configured to:
receive at least one of a place selection signal based on map information or a motion detection signal and interest keyword information from a first user terminal;
transmit, to the first user terminal, data of a street view based on at least one of the place selection signal or the motion detection signal corresponding to a first account of the first user terminal;
transmit, to the first user terminal, a plurality of first accounts and a plurality of second accounts to be displayed separately on the street view;
receive a chat request from the first user terminal for requesting a chat with a second user terminal corresponding to the plurality of first accounts;
receive a result regarding whether to accept the chat in response to the chat request from the second user terminal;
determine whether a first account of the first user terminal and a first account of the second user terminal on the street view satisfy a selected condition;
transmit, to the first user terminal, quest information for satisfying the selected condition; and
provide the chat service between the first user terminal and the second user terminal in response to completing the quest information,
wherein the plurality of first accounts is determined based on at least one of the place selection signal or the motion detection signal, and
wherein the plurality of second accounts is determined based on the interest keyword information.

22. The method of claim 1, wherein the quest information comprises a quest for inducing motion detected by a sensor of the first user terminal.

* * * * *